United States Patent [19]
Morales

[11] Patent Number: 5,369,908
[45] Date of Patent: Dec. 6, 1994

[54] APPARATUS FOR ATTRACTING AND TRAPPING INSECTS

[76] Inventor: Reginald D. Morales, 2750 Coltwood Dr., San Jose, Calif. 95148

[21] Appl. No.: 192,249

[22] Filed: Feb. 7, 1994

[51] Int. Cl.⁵ ............................................. A01M 1/10
[52] U.S. Cl. ..................................................... 43/111
[58] Field of Search ........................... 43/111, 71, 138

[56] References Cited

U.S. PATENT DOCUMENTS

| | | | |
|---|---|---|---|
| 1,252,151 | 1/1918 | Nakamigawa | 43/111 |
| 1,326,818 | 12/1919 | Yoshikawa | 43/111 |
| 1,477,081 | 12/1923 | Salinas | 43/111 |
| 1,577,148 | 3/1926 | Pical | 43/111 |
| 1,822,307 | 9/1931 | Nettekoven . | |
| 1,971,640 | 8/1934 | Cameron . | |
| 2,490,498 | 12/1949 | Wisen | 43/111 |
| 2,873,551 | 2/1959 | Misko | 43/111 |
| 4,266,363 | 5/1981 | Chen . | |

FOREIGN PATENT DOCUMENTS 155660 11/1904 Germany ............................... 43/111

Primary Examiner—P. Austin Bradley
Assistant Examiner—Jeanne M. Elpel
Attorney, Agent, or Firm—David L. Baker

[57] ABSTRACT

An insect trap for use in capturing flies, ants and other insects, which insect trap utilizes a slowly moving baited conveyor belt to convey insects into the interior of the trap. In its preferred embodiments, the trap also features means for the continued refurbishment of the bait supply on the slowly moving conveyor belt.

1 Claim, 2 Drawing Sheets

APPARATUS FOR ATTRACTING AND TRAPPING INSECTS

BACKGROUND OF THE INVENTION

1. Field of the Invention

This invention relates generally to the field of insect control means, particularly those involving baited traps. More specifically, it relates to baited traps which utilize powered and/or motorized mechanisms in their operation.

2. Description of the Prior Art

Typical examples of insect traps may be found in the patent issued to Nettekoven for an ant trap (U.S. Pat. No. 1,822,307) and the patent issued to Cameron for an insect trap (U.S. Pat. No. 1,971,640). The Nettekoven patent teaches the design for an ant trap in which the insects, lured by the odor of a suitable bait, are forced to assume an inverted position as they traverse the inventor's planned path to the bait. In this position they are no longer able to maintain their grip on the path and fall downward into a container of water where they are exterminated. The Cameron patent also relies on the odor of a suitable bait to induce roaches or ants to enter the trap. In order to do so, however, they must crawl through a series of passages which are designed to baffle and resist their efforts to leave the trap. Neither patent utilizes any powered or motorized mechanism in trapping insects. Instead, they rely on the insects' own attraction and efforts to reach the bait material.

An example of a powered/motorized insect trap (and of more recent efforts in this field) may be found in the teachings of the patent issued to Chen for an automatic trap for catching cockroaches (U.S. Pat. No. 4,266,363). The Chen patent, unlike those previously described, is electrically powered. Its trapping mechanism is triggered by the entry of a single cockroach into its interior and acts to sweep the cockroach into a confinement cell for extermination. After accomplishing this, the mechanism returns to its "ready" state to await the entry of another cockroach.

The majority of insect control methods utilize either poisons (pesticides) or traps to exterminate damaging insects. Pesticides may be directly dispensed by spraying or some other means. In the alternative, pesticides may be incorporated into bait materials which attract the insects to be exterminated; the bait is then consumed by the insects. However, pesticides also pose dangers to humans, animals, or other beneficial insects. Thus, traps baited with suitable nonpoisonous attractants provide a more ideal means for controlling and/or exterminating insect pests such as flies or ants. In such traps, the insect to be exterminated is generally required to enter the trap by itself, attracted by the odor of a suitable bait material.

Notwithstanding prior advances in the art, few traps in existence have any utility in capturing flies. The reasons for this are based in part on the extreme wariness of these ubiquitous pests, which makes them extremely unlikely to enter into any trap enclosure. Because flies easily become disturbed, and quickly flee from any abrupt movement, they usually evade traps that feature, and rely on, fast acting mechanisms. Thus, prior traps, which typically rely on the insect's slow movements in searching for hidden bait are generally useless in capturing flies. In order to successfully trap flies, it is first necessary to attract them by providing openly exposed bait, and then providing means for moving them into the interior of a device in a such a manner that does not disturb or repel them.

All traps known to the inventor tend to lose their ability to attract insects after a relatively short period of time. The reason for this is simple. Since bait material must be exposed to, the air to attract insects, it tends to dry out and lose its potency as bait rather quickly. Moreover, in a trap of the type needed to capture flies, bait is usually made available for consumption by the flies being attracted. This presents a different situation from that which typically exists in insect traps, where the bait (while open to the air) is housed in such a manner that it may not be reached and consumed by the insects attracted. Thus, a need also exists (both generally in the field and particularly with regard to the type of trap designed to capture flies) for a means of renewing and refurbishing the bait used to attract the insects to be trapped.

SUMMARY OF THE INVENTION

The invention described herein accomplishes and satisfies numerous desirable objects, including those left unsatisfied by prior art designs. First, it provides an effective means for capturing the elusive fly as well as other insects. Second, it may be produced utilizing inexpensive and readily available materials and technology. Third, it is lightweight, sturdy, and easy to use and clean. Fourth, it operates with very low power consumption and is, therefore, inexpensive to operate. Fifth, it includes (in its preferred embodiments) means for constantly renewing and refurbishing the bait material utilized.

The present invention achieves the above objects, among others, by providing in one aspect an apparatus for attracting and trapping insects. The apparatus has a trap container defined by outer walls with an aperture in at least one outer wall providing access to an interior thereof. It also provides a first conveyor belt, having an outer surface and an inner surface, with the outer surface capable of being baited with substances that are able to attract the insects and cause the insects to position themselves upon the first conveyor belt. The first conveyor belt is mounted on a plurality of rollers such that an inner surface of the first conveyor belt is adjacent to the rollers and an outer surface of the first conveyor belt is opposite therefrom; it is also positioned in relation to the aperture in such a manner that some portions of the outer surface are constantly exterior to the trap container and other portions are always within an interior of the trap container. There is a mechanism for maintaining the first conveyor belt in motion around the rollers in such manner that the portions of the outer surface exterior to the trap container are continually conveyed through the aperture into the interior of the trap container and back out therefrom in continuing alternating fashion. Finally, there is a blocking mechanism for preventing insects conveyed into the interior of the trap container on the conveyor belt from exiting therefrom via the aperture.

Preferably, the invention also includes an application mechanism for applying bait material to the outer surface of the first conveyor belt in such manner that every portion of the first conveyor belt has additional bait material applied thereto at least once during each complete rotation of the first conveyor belt. This mechanism should include a bait roller in frictional contact with the outer surface of the first conveyor belt, with the bait roller being partially immersed in a bait container having a supply of bait material, and with the bait material being capable of adhering to the bait roller and to the outer surface of the conveyor belt. Additionally, the bait container and the bait roller are positioned in the interior of the trap container.

Preferably, there is also a mechanism for dividing the interior of the trap container into a first section into which the insects conveyed into the interior of the trap container are retained, and a second section wherein the bait container and the roller are positioned. This mechanism preferably includes a brush immediately proximate to and frictionally in contact with the outer surface of the first conveyor belt.

The invention has a first access door in an outer wall of the trap container in order to remove captured insects and other matter from the interior of the first section, and a second access door in the outer wall of the trap container in order to renew the supply of bait material in the bait container.

The blocking mechanism should include a plurality of barriers progressing through the aperture in tandem with the first conveyor belt, with each of the barriers being capable of fitting through the aperture and of blocking egress from the trap container by the insects held therein. The barriers are mounted on a second conveyor belt, with the second conveyor belt being mounted on a plurality of rollers within the circuit of the first conveyor belt, and the second conveyor belt shares a common roller with the first conveyor belt at a point adjacent the aperture. Finally, openings are provided in the first conveyor belt of a size and shape sufficient to allow the barriers mounted on the second conveyor belt to pass through the first conveyor belt as the first conveyor belt and the second conveyor belt converge upon approaching the aperture. A roller is mounted at a distal edge of each barrier to reduce frictional resistance between the barriers and the first conveyor belt, and also to help seal insects within the interior of the apparatus.

DETAILED DESCRIPTION OF THE PREFERRED EMBODIMENT

Figure 1:
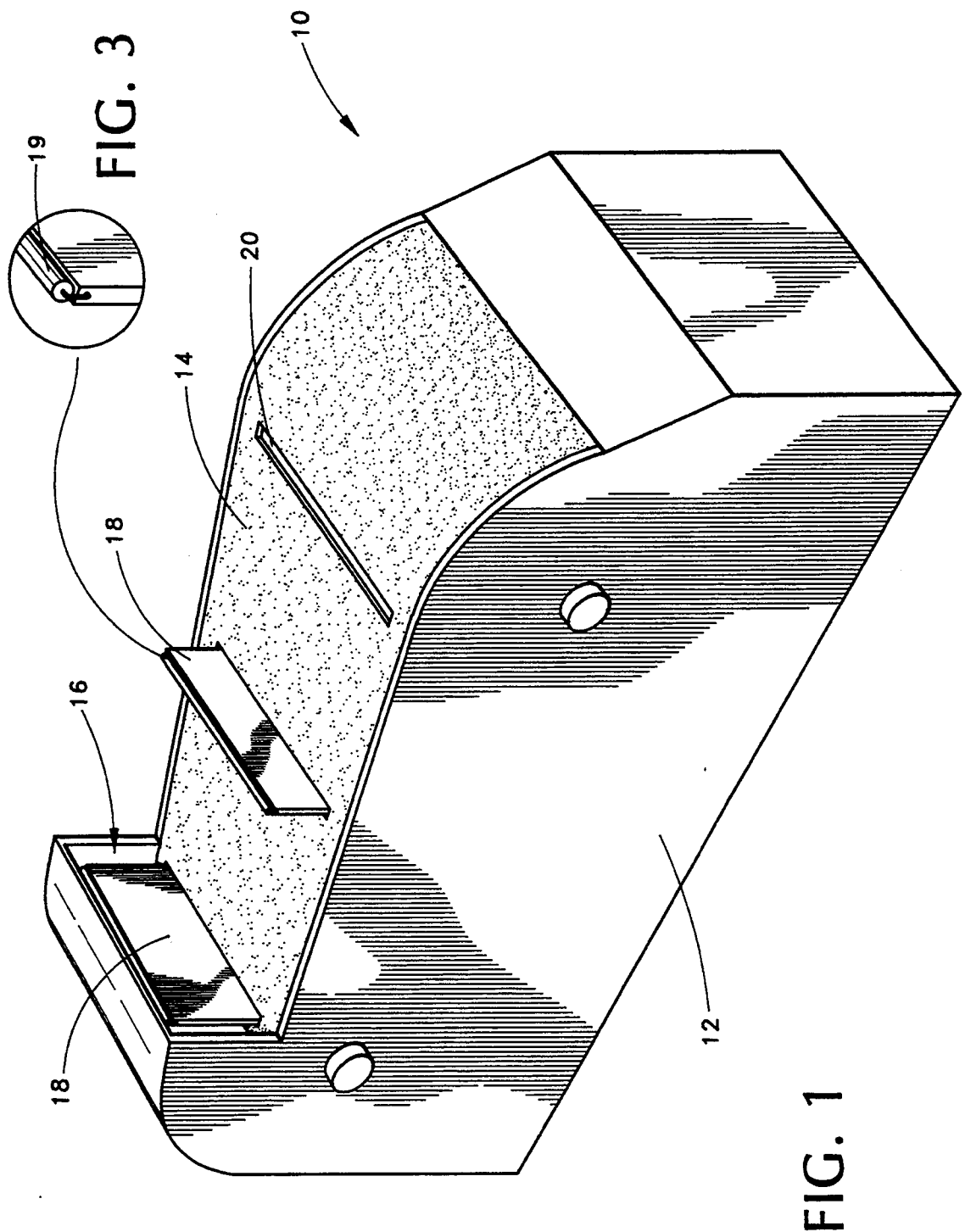
FIG. 1 provides a perspective view of an ant and fly trap produced in accordance with the present invention.

As illustrated in FIG. 1, the preferred embodiment 10 of this invention is characterized by a box-like container 12 which serves as the body of the device and may be readily produced from plastic or other durable materials. Its upper surface is substantially covered and provided by a first conveyor belt 14. When the apparatus is in operation, the first conveyor belt 14 is coated with bait material such that flies or other insects (such as ants) that are to be trapped are attracted to its surface. As will be noted, the design illustrated exposes a substantial area of the first conveyor belt 14 to the air exterior to the container 12. It thereby provides a large area on the surface of the first conveyor belt 14 as a "landing zone" for flies and also exposes a maximum amount of its baited surface to the air, increasing the ability to attract flies, ants or other insects by odor.

The first conveyor belt 14 may be advantageously produced from commonly available flexible plastic webbing materials. When it is in operation, it acts to convey flies or other insects feeding on its baited surface slowly and smoothly toward the aperture 16. As it does so, blades 18 gradually emerge, protruding through the blade slots 20 provided in the first conveyor belt 14. Each blade 18 reaches its point of fullest extension through the first conveyor belt 14 as it reaches the aperture 16. At fullest extension, the blade 18 passing through the aperture 16 has the same approximate height and dimensions as the aperture 16. Thus, it functions as a door to the trap, blocking egress from its interior by insects conveyed therein on the slowly moving first conveyor belt 14.

Figure 2:
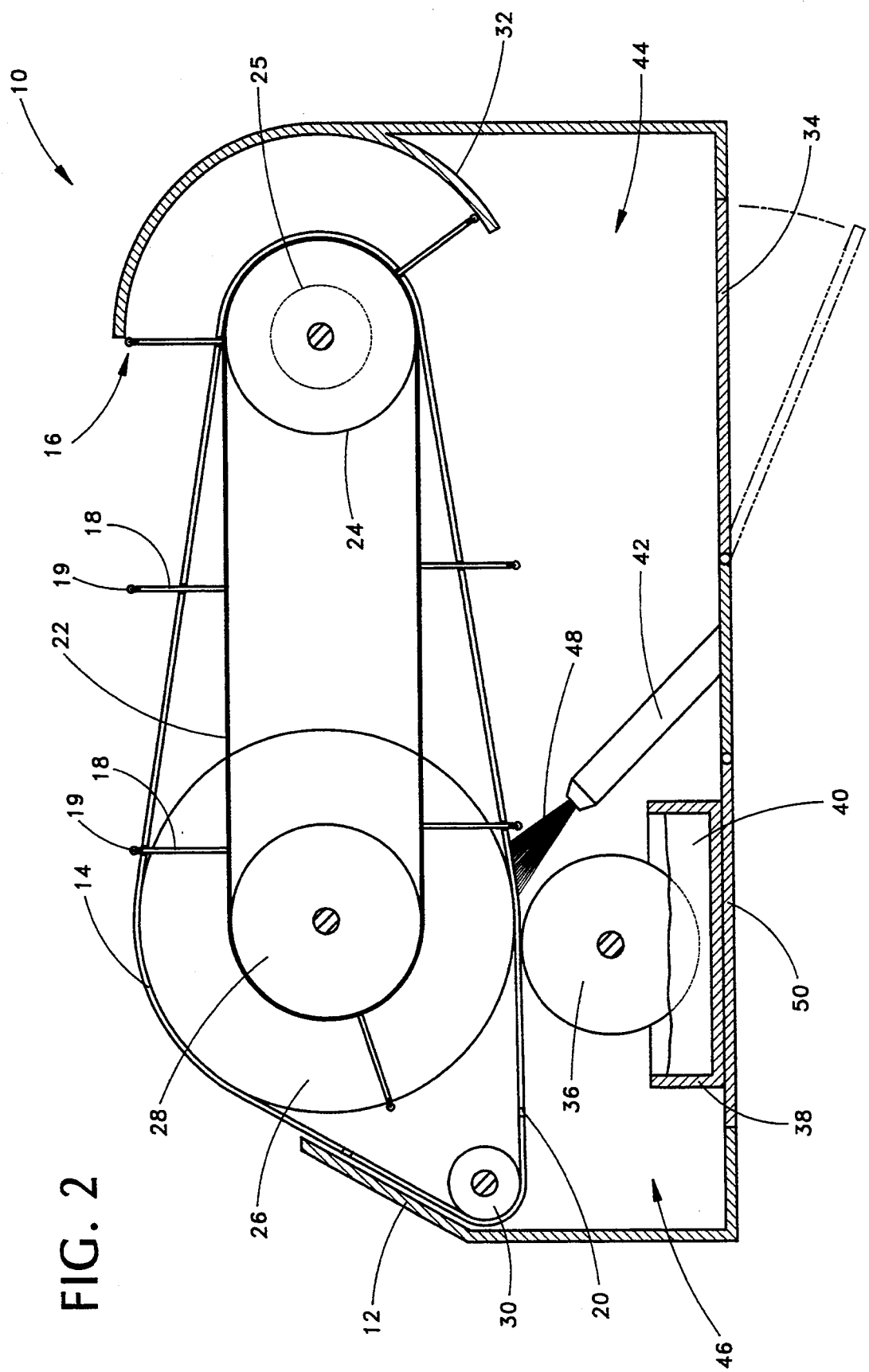
FIG. 2 provides a view from the side in cross-section of the ant and fly trap produced in accordance with the teachings of this invention.

The mechanisms by which the foregoing operations are accomplished may best be understood by reference to FIG. 2, which provides a cross-sectional view of the insect trap disclosed herein. As will be noted, an inner second conveyor belt 22 is located within the circumference of the outer first conveyor belt 14. While the first conveyor belt 14 acts to convey insects on its surface into the interior of the device, the second conveyor belt 22 serves as a mounting surface for the blades 18. The second conveyor belt 22, like the first conveyor belt 14, may also be produced from a wide variety of flexible plastic materials.

Referring once again to FIG. 2, it will be noted that the first conveyor belt 14 and the second conveyor belt 22 share a common roller (the drive roller 24) and that a second pair of rollers for these two belts (the outer roller 26 and the inner roller 28) are coaxial. In the preferred embodiment, a third roller (the tension roller 30) has been added to aid and assist in adjusting the tension of the first conveyor belt 14. However, the operation of the tension roller 30 may generally be ignored in understanding the means by which the blades 18 are made to protrude slowly through the first conveyor belt 14. For this purpose, the two belts may be considered as mounted only on the drive roller 24, the outer roller 26 and the inner roller 28.

One may begin by considering a portion of the first conveyor belt 14 traversing the top portion of the outer roller 26. As the first conveyor belt 14 moves toward the drive roller 24, it will traverse downward to a position where it is adjacent to the second conveyor belt 22, which has blades 18 affixed thereto. This is made possible by the positioning of the blade slots 20 in the first conveyor belt 14. The blade slots 20 are positioned on the first conveyor belt 14 so as to allow the blades 18 to protrude through the first conveyor belt 14 as the first and second conveyor belts 14 and 22 converge on the drive roller 24. Thus, it will be understood that the blades 18 do not, as it appears in watching the device in operation, actively extend upward through the blade slots 20 in the first conveyor belt 14. Rather, it is the first conveyor belt 14 that is allowed to drop slowly downward over the blades 18 by virtue of the blade slots 20 as it advances towards the aperture 16. Like the movement of the first conveyor belt 14, the emergence of the blades 18 through the blade slots 20 as the belt moves towards the aperture 18 is gradual so as not to disturb and alarm the flies positioned on the first conveyor belt 14.

Rollers 19 are positioned at the distal edges of the blades 18 in order to prevent any possible frictional scraping between blades 18 and the underside of conveyor belt 14, especially if a slight misalignment between each blade 18 and a corresponding blade slot 20 occurs.

An insect positioned on the first conveyor belt 14 will, if left undisturbed, pass through the aperture 16 as it is conveyed into the interior of the container 12. Then, the insect(s) will be conveyed through the portion of the container 12 bounded by the curved section 32. Curved section 32 should preferably be produced from clear plastic so that a variation of light caused by the entry into the dark interior of the container 12 does not cause flies positioned on the surface of the first conveyor belt 14 to flee prior to passage beyond this section of the container 12.

Once an insect has been conveyed past the curved section 32, it is prevented from exiting the interior of the container 12 via the aperture 16 by virtue of the positioning of the blades 18 on the second conveyor belt 22 and their relationship to the curved section 32 of the container 12. As will be noted, there is at least one blade 18 positioned within the arc length of the curved section 32 at all times. Each roller 19 may make frictional rolling contact with curved section 32 to further seal in trapped insects within the interior of the container 12. Thus, an insect that has been moved by the first conveyor belt 14 past the curved section 32 will not, therefore, be able to exit via the aperture 16.

Both the first conveyor belt 14 and the second conveyor belt 22 are mounted on and driven by a drive roller 24. The drive roller 24 is, in turn, connected by appropriate gearing (utilizing techniques well known in the mechanical arts) to a small detachable electric motor 25. The operating speed of the motor 25 and the gearing should be chosen in order to advance the first conveyor belt 14 at a sufficient rate to perform the trapping function.

Motor 25 should preferably be light in weight with a minimal power consumption. The compact motor 25 may be removed when it is time to empty and dispose of insects trapped within the container 12. Extermination of trapped insects may be accomplished quickly and simply after removing the motor 25 by merely immersing the entire device in a container of soapy water. After a short period of immersion, dead insects may be removed from the interior of the container 12 by opening the first access door 34 located on the bottom of the container 12. This allows liquid remaining in the interior to drain (taking dead insects with it), and also opens the interior for additional flushing and cleaning.

As illustrated in FIG. 2, the ant and fly trap taught herein also incorporates, in its preferred embodiments, a means for renewing and refurbishing the bait deposited on the surface of the first conveyor belt 14. This may be accomplished, in accordance with the teachings and mode of operation of this invention, by the use of a bait roller 36 positioned within the container 12. As illustrated, the bait roller 36 is positioned so that it snugly contacts the underside of the first conveyor belt 14. It is also immersed in a bait container 38 in which liquid bait material 40 is located. Given this configuration, movement of the first conveyor belt 14 will result in the continuous application of liquid bait material 40 to the first conveyor belt 14 as the first conveyor belt 14 passes the bait roller 36. Such movement causes the rotation of the portion of the bait roller 36 adjacent to the conveyor belt 14 downward through the liquid bait material 40 located in the bait container 38 (where part of the liquid bait material 40 will adhere to the surface of the bait roller 36). In this manner, the supply of bait on every portion of the first conveyor belt 14 is renewed each time that portion moves past the bait roller 36.

Where a bait roller 3(; is introduced into the container 12 it will be desirable to further subdivide the interior of the container 12 so that flies or other insects conveyed therein may not reach, consume, or spoil the bait supply. As illustrated in FIG. 2, this may be accomplished by the addition of a barrier 42, which is impassable to insects and serves to divide the interior of the container 12 into a first section 44 into which insects are conveyed and retained and a second section 46 in which the bait roller 36 and bait container 38 may be maintained.

A barrier of this type, as illustrated by the barrier 42 shown in FIG. 2, may advantageously utilize a brush 48 positioned adjacent to the first conveyor belt 14 as a means of restricting insect passage into the second section 46 while simultaneously allowing the continued passage of the first conveyor belt 14 through the first section 44 and the second section 46. The brush 48 is also useful in removing and cleaning any insects or other debris that may still be clinging to the first conveyor belt 14. If the trap container 12 is subdivided as shown in FIG. 2, a second access door 50 or some other means should also be provided to enable access to the second section 46, which contains the bait roller 36 and bait container 38 so that the bale supply may be periodically renewed.

The entire device (with the exception of the motor 25) may be simply and easily constructed from plastics or other inexpensive and durable materials. In this area as in all other matters pertaining to this invention it will be understood that numerous variations are possible without departing from the essential teachings and spirit of this invention as set forth in the following claims.

I claim:

1. An apparatus for attracting and trapping insects, comprising:
    (a) a trap container defined by outer walls with an aperture in at least one outer wall providing access to an interior thereof;
    (b) a first conveyor belt, having an outer surface and an inner surface, said outer surface capable of being baited with substances that are able to attract said insects and cause said insects to position themselves upon said first conveyor belt;
    said first conveyor belt being mounted on a plurality of rollers such that an inner surface of said first conveyor belt is adjacent to said rollers and an outer surface of said first conveyor belt is opposite therefrom;
    said first conveyor belt being positioned in relation to said aperture in such a manner that some portions of said outer surface are constantly exterior to said trap container and other portions are always within an interior of said trap container;
    (c) a motive means for maintaining said first conveyor belt in motion around said rollers in such manner that said portions of said outer surface exterior to said trap container are continually conveyed through said aperture into said interior of said trap container and back out therefrom in continuing alternating fashion;
    (d) a blocking means for preventing insects conveyed into said interior of said trap container on the said conveyor belt from exiting therefrom via said aperture;
    (e) an application means, for applying bait material to said outer surface of said first conveyor belt in such manner that every portion of said first conveyor belt has additional bait material applied thereto at least once during each complete rotation of said first conveyor belt, comprising:
  a bait roller in frictional contact with said outer surface of said first conveyor belt;
  said bait roller being partially immersed in a bait container having a supply of bait material;
  said bait container and said bait roller are positioned in said interior of said trap container; and
  said bait material being capable of adhering to said bait roller and to said outer surface of said conveyor belt;
(f) a dividing means for dividing said interior of said trap container into a first section into which said insects conveyed into said interior of said trap container are retained, and a second section wherein said bait container and said roller are positioned;
(g) a brush immediately proximate to and frictionally in contact with said outer surface of said first conveyor belt;
(h) a first access door in an outer wall of said trap container in order to remove captured insects and other matter from said interior of said first section;
(i) a second access door in said outer wall of said trap container in order to renew said supply of bait material in said bait container;
(j) a plurality of barriers progressing through said aperture in tandem with said first conveyor belt, each of said barriers being capable of fitting through said aperture and of blocking egress from said trap container by said insects held therein;
(k) said barriers are mounted on a second conveyor belt, said second conveyor belt being mounted on a plurality of rollers within the circuit of the first conveyor belt, and said second conveyor belt sharing a common roller with said first conveyor belt at a point adjacent said aperture;
(l) a plurality of openings are provided in said first conveyor belt of a size and shape sufficient to allow said barriers mounted on said second conveyor belt to pass through said first conveyor belt as said first conveyor belt and said second conveyor belt converge upon approaching said aperture; and
(m) a roller mounted at a distal edge of each of said plurality of barriers.

* * * * *